United States Patent [19]

Aoki

[11] Patent Number: 5,218,589
[45] Date of Patent: Jun. 8, 1993

[54] DEFECT DETECTING METHOD
[75] Inventor: Ikuo Aoki, Yokohama, Japan
[73] Assignee: Ricoh Company, Ltd., Tokyo, Japan
[21] Appl. No.: 510,544
[22] Filed: Apr. 18, 1990

[30] Foreign Application Priority Data

Apr. 24, 1989 [JP] Japan .................................. 1-104094
Apr. 24, 1989 [JP] Japan .................................. 1-104095
Feb. 14, 1990 [JP] Japan .................................. 2-33090

[51] Int. Cl.$^5$ .............................................. G11B 7/00
[52] U.S. Cl. ............................... 369/44.34; 369/44.26; 369/44.32
[58] Field of Search ............... 369/44.34, 44.26, 44.32, 369/44.33, 44.39, 44.11, 44.12, 44.13, 109, 43, 124, 53, 32, 54, 58; 250/201.5, 48, 49

[56] References Cited

U.S. PATENT DOCUMENTS

| 4,562,564 | 12/1985 | Bricot et al. | 369/44.26 |
| 4,564,929 | 1/1986 | Yonezawa et al. | 369/44.34 |
| 4,663,751 | 5/1987 | Kaku et al. | 369/44.26 |
| 4,722,079 | 1/1988 | Matsumoto | 369/44.32 |
| 4,736,354 | 4/1988 | Yoshio | 369/44.32 |
| 4,748,609 | 5/1988 | Yonezawa et al. | 369/44.26 |
| 4,750,163 | 6/1988 | Yamamiya et al. | 369/44.32 |
| 4,785,442 | 10/1988 | Ohtake et al. | 369/44.34 |
| 4,855,983 | 8/1989 | Arai | 369/44.34 |
| 4,872,152 | 10/1989 | Tsuyoshi et al. | 369/124 |
| 5,027,338 | 6/1991 | Ata | 369/44.32 |

FOREIGN PATENT DOCUMENTS 61-104337 5/1986 Japan .................................. 369/44.32
62-92133 4/1987 Japan .................................. 369/44.32

Primary Examiner—Tommy Chin
Assistant Examiner—Thai Tran
Attorney, Agent, or Firm—Cooper & Dunham

[57] ABSTRACT

In a method for detecting a defect in a prepit as a sampling object formed on a recording face of an information recording medium in an optical or magnetooptic disk drive unit, an optical or magnetooptic disk is used as the information recording medium and focusing and tracking controls are performed by using a sample servo system at recording and reproducing times of information. This method has the steps of disposing a device for checking a plurality of reproducing signals provided when a light spot moves onto the prepit in the detection of the defect therein and calculating an average value in voltage with respect to these reproducing signals; setting the average value as a reference voltage level of the reproducing signals and setting a constant window width with respect to the average value; calculating the difference in voltage between the reference level and a sampling value of each of the reproducing signals corresponding to the prepit every time when each of the reproducing signals is sampled; comparing the voltage difference every sampling with the window width; and judging that the prepit is defective when the voltage difference exceeds the window width.

5 Claims, 6 Drawing Sheets

DEFECTIVE PREPIT

DEFECTIVE PREPIT

DEFECTIVE PREPIT

NORMAL PREPIT $\Delta W > \Delta W1 \quad \Delta W > \Delta W2 \quad \Delta W > \Delta W3$

Fig. 3b

DEFECTIVE PREPIT $\Delta W > \Delta W1 \quad \Delta W > \Delta W2 \quad \Delta W < \Delta W3$

DEFECT DETECTING METHOD

BACKGROUND OF THE INVENTION

1. Field of the Invention

The present invention relates to a method for detecting a defect in a prepit sampled when a control operation is performed by using a sample servo (discrete block servo) system in an optical disk drive unit, a magnetooptic disk drive unit, etc.

2. Description of the Related Art

In an optical disk drive unit or a magnetooptic disk drive unit, focusing and tracking controls, etc. are performed by using an optical or magnetooptic disk as an information recording medium and a sample servo system when information is recorded and reproduced. In a tracking system of the above sample servo system, prepits for sampling are formed on a recording face of the information recording medium. A tracking signal is produced by using a wobble mark of prepits and a synchronization signal is produced by using a clock mark of another prepit so as to preform a synchronizing operation in a PLL control.

However, when the focusing and tracking controls are performed by the sample servo system and there is a defect in a prepit, a tracking shift is caused and the PLL is incorrectly operated when sampling data in this defective prepit portion are used as they are.

Accordingly, it is necessary that such incorrect sampling data are not inputted. Therefore, the detection of a defect in a prepit is an important subject.

SUMMARY OF THE INVENTION

It is therefore an object of the present invention to provide a method for easily and reliably detecting a defect in a prepit for sampling in a sample servo system.

In a first embodiment of the present invention, the above object can be achieved by a method for detecting a defect in a prepit as a sampling object formed on a recording face of an information recording medium in an optical or magnetooptic disk drive unit in which an optical or magnetooptic disk is used as the information recording medium and focusing and tracking controls are performed by using a sample servo system at recording and reproducing times of information, the method comprising the steps of disposing means for checking a plurality of reproducing signals provided when a light spot moves onto the prepit in the detection of the defect therein and calculating an average value in voltage with respect to these reproducing signals; setting the average value as a reference voltage level of the reproducing signals and setting a constant window width with respect to the average value; calculating the difference in voltage between the reference level and a sampling value of each of the reproducing signals corresponding to the prepit every time when each of the reproducing signals is sampled; comparing the voltage difference every sampling with the window width; and judging that the prepit is defective when the voltage difference exceeds the window width.

In the defect detecting method in the first embodiment of the present invention, an average voltage value with respect to the reproducing signals provided by plural prepits is calculated. The constant window width is set with this average voltage value as a reference level. The difference in voltage between the reference level and each of the sampling values is calculated every time when the reproducing signal corresponding to each of the prepits is sampled at the time of a control operation using the sample servo system. This difference is compared with the window width. Therefore, the defect in each of the prepits can be detected easily and reliably without any influence of the adjacent prepits.

In a second embodiment of the present invention, the above object can be achieved by a method for detecting a defect in a prepit as a sampling object formed on a recording face of an information recording medium in an optical or magnetooptic disk drive unit in which an optical or magnetooptic disk is used as the information recording medium and focusing and tracking controls are performed by using a sample servo system at recording and reproducing times of information, the method comprising the steps of dividing sampling points into sampling effective and ineffective points for the defect detection when the defect in the prepit is detected; setting the sampling effective points for the defect detection as a sampling point of each of prepit portions and a sampling point every one prepit portion; and setting the sampling ineffective points for the defect detection as sampling points located by one before and after the sampling point of each of the prepit portions.

In the defect detecting method in the second embodiment of the present invention, since the sampling points in the defect detection of the prepit are divided into sampling effective and ineffective points, the threshold value for a binary operation at the time of pattern matching can be easily set by making ineffective a signal voltage level portion between a mirror portion and a prepit portion. As a result, the defect in the prepit can be reliably detected.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a defect detecting method in the present invention will next be described in detail with reference to the accompanying drawings.

Figure 1:
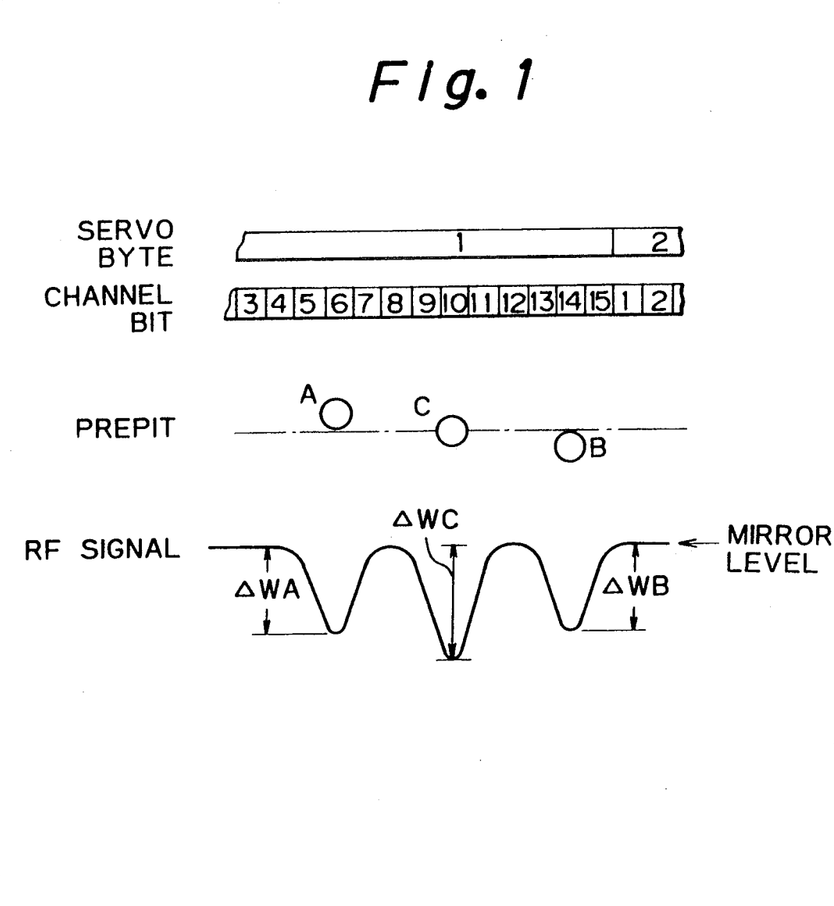
FIG. 1 is a view showing a normal prepit arrangement and a reproducing signal provided by each of prepits.

In an optical disk drive unit or a magnetooptic disk drive unit, focusing and tracking controls, etc. are performed by using an optical or magnetooptic disk as an information recording medium and a sample servo system when information is recorded and reproduced. In a tracking system of the above sample servo system in the optical disk drive unit or the magnetooptic disk drive unit, as shown in FIG. 1, prepits for sampling are formed on a recording face of the information recording medium. In this figure, a tracking signal is produced by using a wobble mark of prepits A and B and a synchronization signal is produced by using a clock mark of prepit C so as to perform a synchronizing operation in a PLL control.

However, when the focusing and tracking controls are performed by the sample servo system and there is a defect in a prepit, a tracking shift is caused and the PLL is incorrectly operated when sampling data in this defective prepit portion are used as they are.

Accordingly, it is necessary that such incorrect sampling data are not inputted. Therefore, the detection of a defect in a prepit is an important subject.

The generally proposed methods for detecting a defect in a prepit are as follows.

(1) A pattern matching method using a reproducing signal in a prepit portion that has a constant pattern, in which it is judged to be defective when a pattern except for this constant pattern is generated.

(2) A window method in which it is judged to be defective when the change in sampling value between adjacent sampling points is equal to or greater than a constant value.

In the pattern matching method of the above item (1), since the above-mentioned pattern is judged, it is difficult to set a threshold value when the reproducing signal is two-valued. Therefore, this method is not practically used so much at the present time.

In contrast to this, in the window method of the item (2), the scale of a circuit is relatively small and it is easy to realize the defect detecting method so that some embodied examples with respect to this method are reported (see, for example, Japanese Patent Application Laying Open (KOKAI) No. 63-155426).

However, it is insufficient to detect the defect in a prepit by only the window method of item (2). Namely, in the window method, since the change in sampling value between adjacent sampling points is checked, the above judgment is performed by a relative value with respect to the sampling value. Therefore, when this judgment is not performed together with a judgment using an absolute value with respect to the sampling value, there is a case in which no defective prepit portion is detected.

Figure 2A:
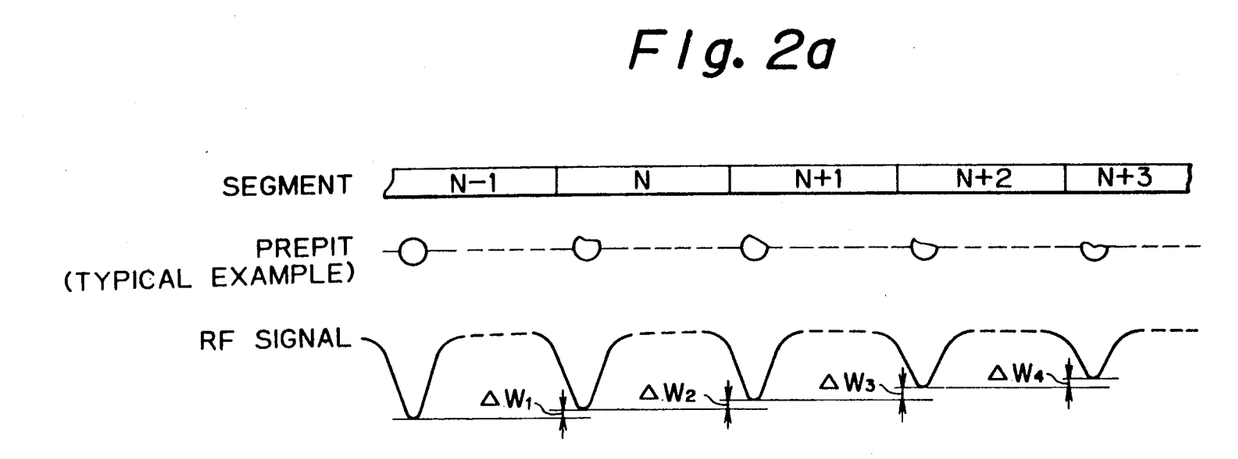
FIGS. 2a and 2b are explanatory views showing detected examples of defects by a general defect detecting method.
Figure 2B:
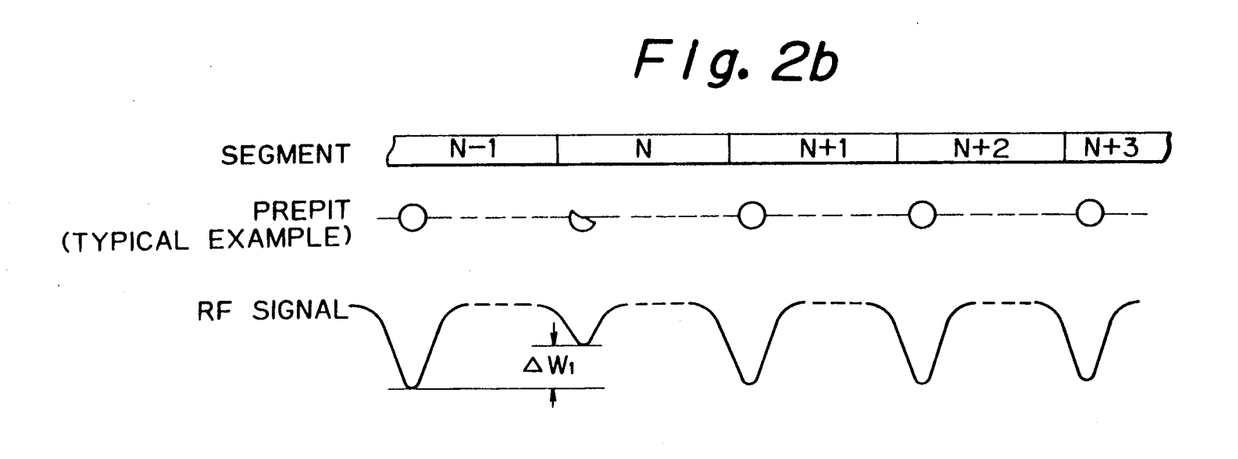

As a concrete example, when there is a single defective prepit as shown in FIG. 2b, an RF signal with respect to a defective pit portion is greatly changed and the difference $\Delta W_1$ in voltage of RF signal between this defective pit portion and an adjacent normal prepit portion is large. Accordingly, the sampling value difference $\Delta W_1$ is greater than a preset constant width, i.e., a window width so that the defect in a prepit can be easily detected. However, when the adjacent sampling points are arranged in an order of <normal pit>, <pit having a slight defect> and <defective pit> as shown in FIG. 2a, the change in sampling value between the respective adjacent sampling points is small so that there is a case in which this change does not exceed a constant value. In particular, when the change in voltage level of the reproducing signal is large, the window width cannot be set to be excessively narrow so that the change in sampling value is considerably smaller than the window width. Therefore, there is a problem that the defect in a prepit cannot be detected.

Figure 3A:
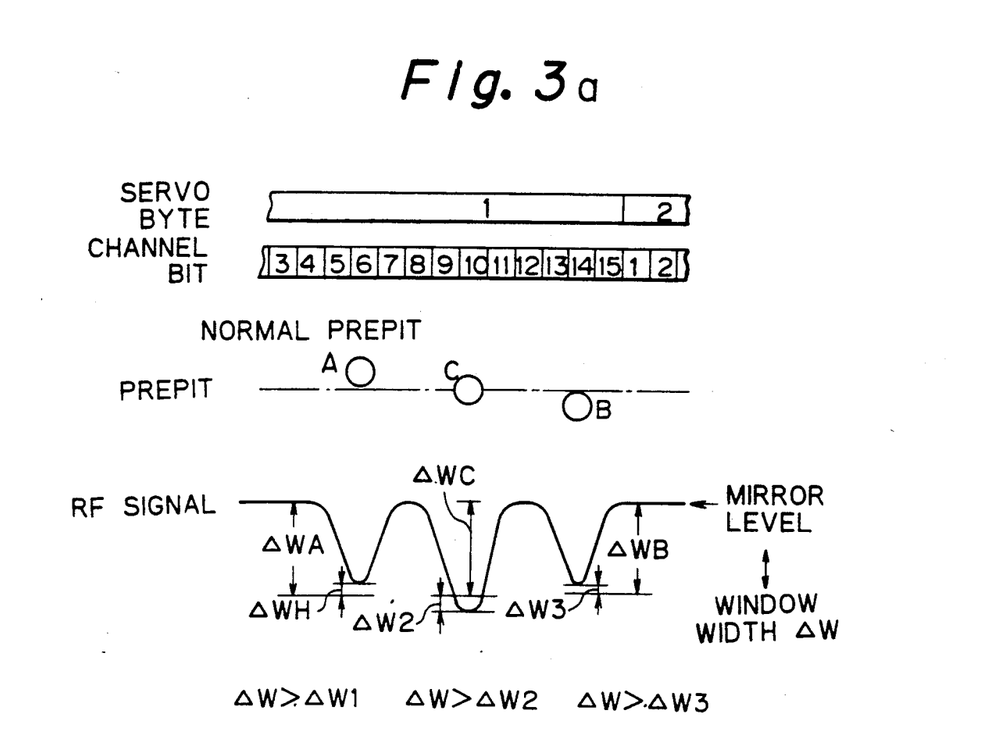
FIGS. 3a and 3b comprise is an explanatory view showing a prepit arrangement and a reproducing signal provided by each of prepits in a defect detecting method in a first embodiment of the present invention.
Figure 3B:
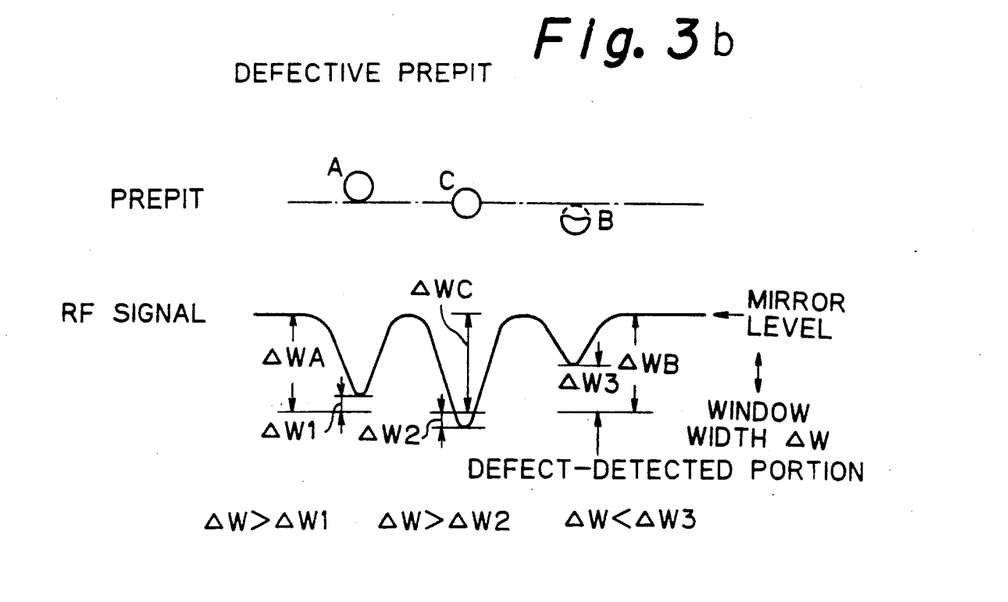

FIG. 3a and 3b show a prepit arrangement and a reproducing signal (an RF signal) provided by each of prepits in a defect detecting method in a first embodiment of the present invention. FIGS. 3a and 3b respectively show cases in which the respective prepits are normal and partially defective.

In FIGS. 3a and 3b, a prepit C is constructed by a clock pit and is arranged in the center of a virtual track shown by one dotted chain line. Prepits A and B are used to reproduce a tracking signal and are arranged in a state in which these prepits are respectively shifted by ¼ track pitch from the center of the virtual track. When a light spot moves onto these prepits A, B and C, the RF signal as shown in FIG. 3a is obtained when the respective prepits are normal. However, when a portion of the prepits is defective, the RF signal as shown in FIG. 3b is obtained.

In the method for detecting defects in prepits A, B and C, a plurality of RF signals with respect to the respective prepits A, B and C are checked and average voltage values $\Delta WA$, $\Delta WB$ and $\Delta WC$ with respect to the prepits A, B and C are calculated. These average voltage values $\Delta WA$, $\Delta WB$ and $\Delta WC$ are set to reference voltage levels of the respective RF signals with respect to the prepits A, B and C.

As shown in FIG. 3b, when differences $\Delta W1$, $\Delta W2$ and $\Delta W3$ in voltage between the respective RF signals with respect to the prepits A, B and C and the reference levels thereof lie within a constant value (window width) $\Delta W$, it is judged that the respective prepits are normal. Further, as shown in FIG. 3b, when the differences $\Delta W1$, $\Delta W2$ and $\Delta W3$ in voltage between the respective RF signals with respect to the prepits A, B and C and the reference levels thereof are equal to or greater than the constant value $\Delta W$, it can be judged that there is a defect in these prepits.

The above average values $\Delta WA$, $\Delta WB$ and $\Delta WC$ can be set to the reference voltage levels for judging the detection of defects in prepits for the following reasons. In general, a defect rate of media is considerably small. Accordingly, when an average value of plural data is calculated, this average value can be treated as data of a normal prepit with respect to these media.

As mentioned above, in the method for detecting a defect in a prepit in the present invention, the plural RF signals with respect to the respective prepits A, B and C are checked and the average voltage values thereof are respectively calculated and compared with the voltage values of the RF signals with respect to the respective prepits. It is judged whether or not the differences in voltage between these average values and the above RF signals lie within a constant value (window width). Thus, it is possible to easily and reliably judge the defects in prepits.

Figure 4:
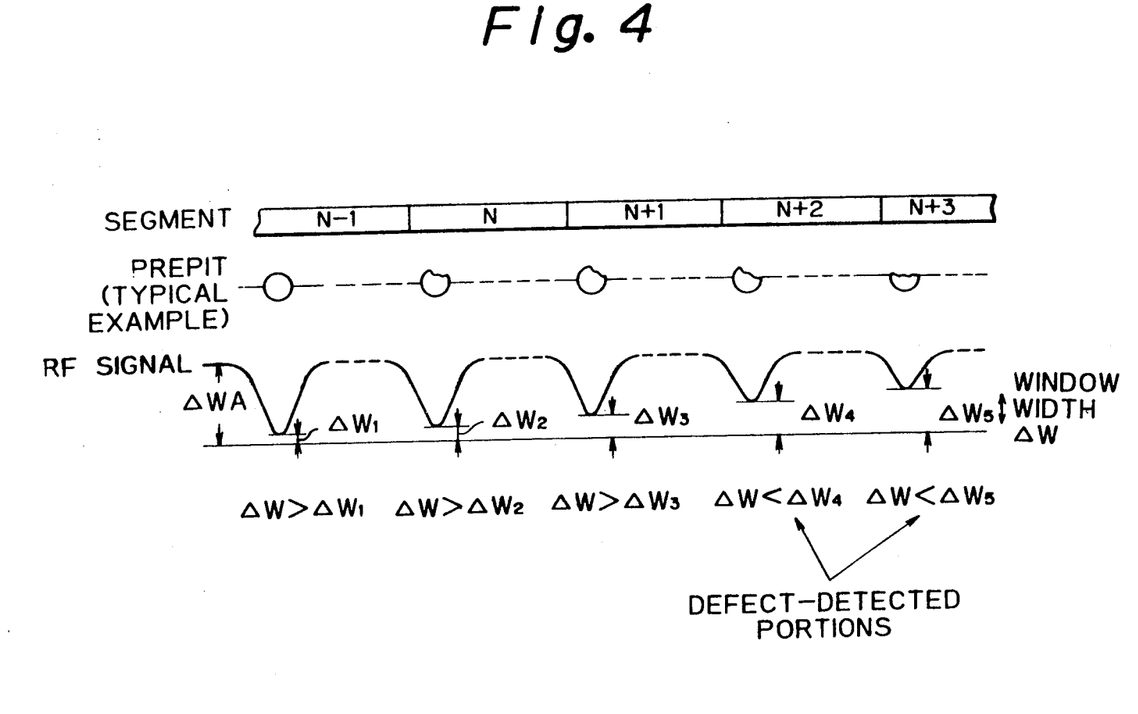
FIG. 4 is an explanatory view showing a detected example of defects in prepits when the defect detecting method in the first embodiment of the present invention is applied.

In the general window method, the defects in prepits cannot be easily and reliably detected when the defective prepits are continuously arranged. However, in accordance with the defect detecting method in the present invention, the defects in prepits can be easily and reliably detected as follows even when the defective prepits are continuously arranged as shown in FIG. 4. Namely, the differences ΔW1 to ΔW5 in voltage between detected signals of every prepit and a reference level (average value) are calculated and compared with the constant value (window width) ΔW determined on the basis of the average value, thereby easily and reliably detecting the defects in prepits.

Further, in the defect detecting method of the present invention, the above reference voltage level is set every medium used to record information. Therefore, this method can hold adaptability to various kinds of dispersions with respect to products such as the difference in reflection ratio between the individual information recording media.

As mentioned above, in accordance with the present invention, in an optical or magnetooptic disk drive unit for performing focusing and tracking controls using a sample servo system at the recording and reproducing times of information, it is possible to easily and reliably detect a defect in a prepit portion as a sampling object. Further, it is possible to prevent in advance a tracking shift and incorrect control in operation of a PLL at the recording and reproducing times of information.

Figure 5:
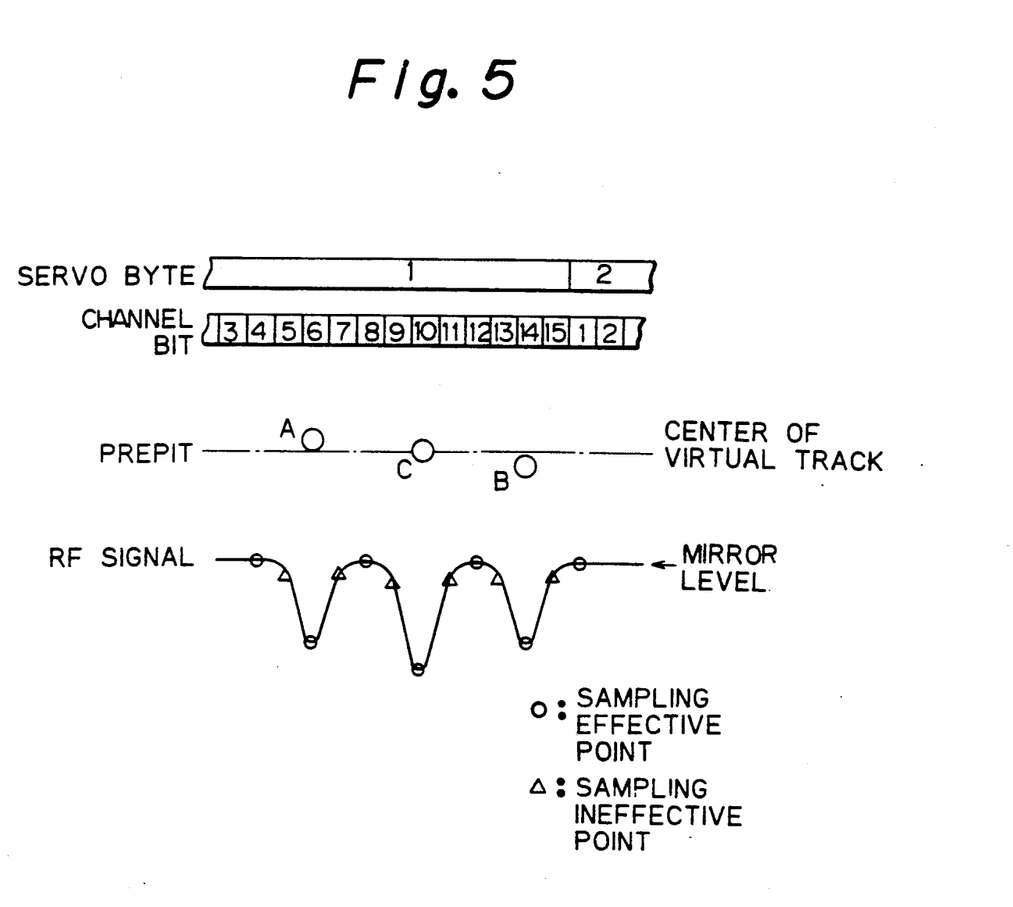
FIG. 5 is an explanatory view showing a prepit arrangement, a reproducing signal provided by each of prepits and sampling effective and ineffective points in a defect detecting method in a second embodiment of the present invention.

FIG. 5 is an explanatory view showing a defect detecting method in a second embodiment of the present invention. This figure shows a prepit arrangement, a reproducing signal (an RF signal) provided by each of prepits and sampling effective and ineffective points.

In FIG. 5, a prepit C is composed of a clock pit and is arranged in the center of a virtual track shown by one dotted chain line. Prepits A and B are used to reproduce a tracking signal and are arranged in a state in which these prepits are respectively shifted by ¼ track pitch from the center of the virtual track. When a light spot moves onto these prepits A, B and C, the RF signal as shown in FIG. 5 is obtained when the respective prepits are normal.

In the method for detecting defects in prepits A, B and C, as shown in FIG. 5, only RF signals with respect to the central points of the prepits A, B and C and an intermediate point every one of the prepits A, B and C, i.e., the prepit portions and mirror portions therebetween are extracted as sampling effective points. A threshold value for a binary operation is set on the basis of the sampling effective points.

In the embodiment shown in FIG. 5, the voltage levels of the RF signals with respect to channel bits 4, 6, 8, 10, 12, 14 and 1 are set as the sampling effective points each shown by a circular mark. The voltage levels of the RF signals with respect to channel bits 5, 7, 9, 11, 13 and 15 are set as sampling ineffective points each shown by a triangular mark. The sampling points are divided into these sampling effective and ineffective points because it is very difficult to set a threshold value for judging "0" and "1" with respect to the RF signals since the voltage levels of the RF signals at the sampling ineffective points correspond to base portions of downwardly projected waveforms having the prepits A, B and C and are voltage levels between the prepit portions and the mirror portions (non-prepit portions).

The reasons why the defects in prepits can be accurately detected by only the above-mentioned sampling effective points will next be described with reference to FIGS. 6a, 6b and 6c.

Figure 6A:
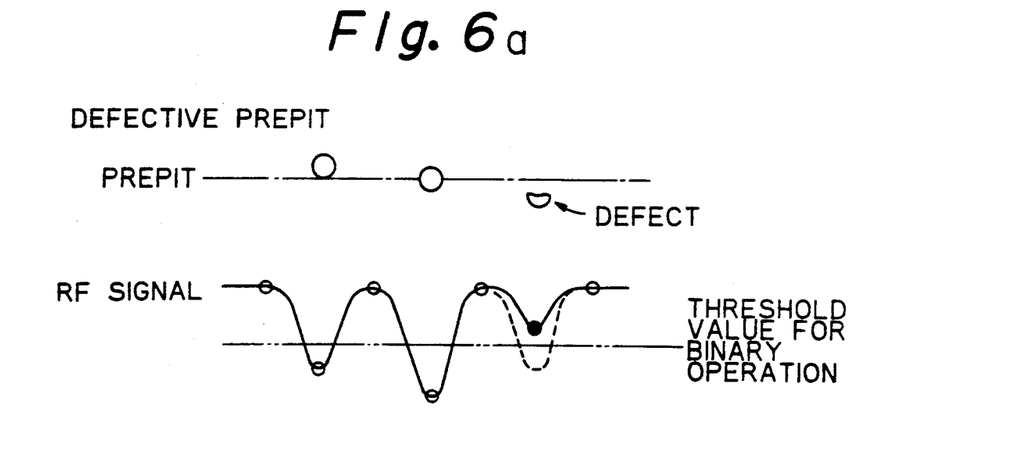
FIGS. 6a, 6b and 6c comprise explanatory view showing a detected example of defects in prepits when the defect detecting method in the second embodiment of the present invention is applied.
Figure 6B:
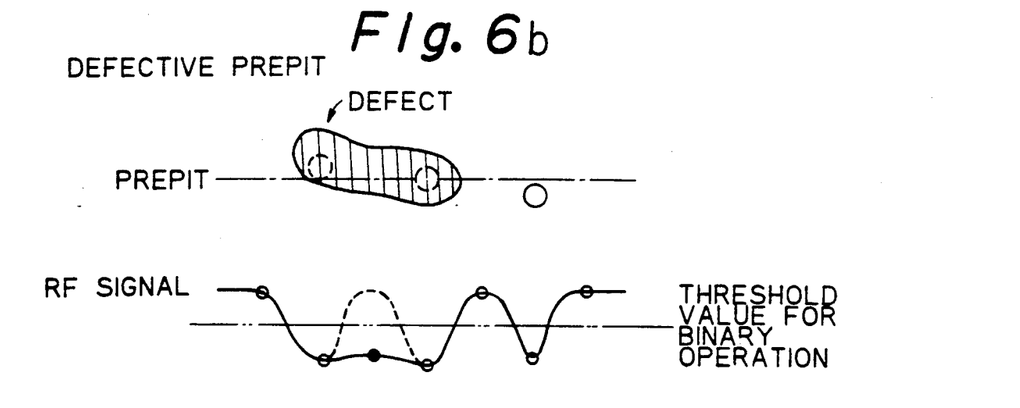
Figure 6C:
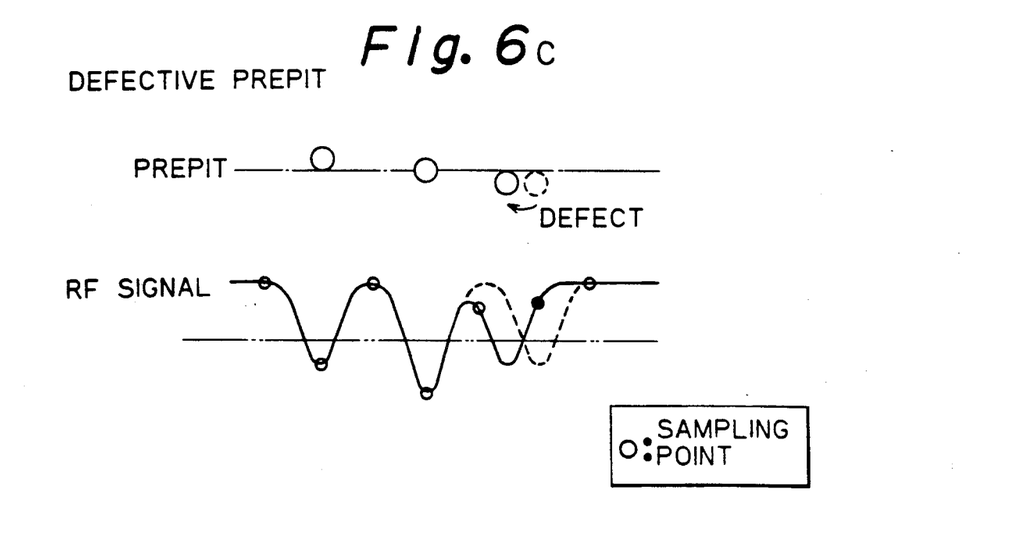

FIG. 6a shows a case in which a prepit is defective, FIG. 6b shows a case in which there is a defect larger in size than prepits, FIG. 6c shows a case in which the position of a prepit is shifted. In each of these cases, the defects can be easily detected at a sampling point shown by a black circle in each of FIGS. 6a, 6b and 6c. Namely, when there is no defect in the prepits, values "1" and "0" are alternately detected at the sampling point two-valued on the basis of the threshold value for a binary operation. When there is a defective portion in the prepits, values "1", "1", "1", or values "0", "0", "0" are detected at the sampling point. Therefore, the defective portion in the prepits can be easily detected.

As mentioned above, in the defect detecting method in the present invention, a defect in prepits is detected by the division of sampling effective and ineffective points and is detected on the basis of only the sampling effective points. Accordingly, a threshold value for a binary operation at the time of pattern patching can be set by making ineffective signal voltage level portions between prepit and mirror portions. This threshold value for a binary operation is compared with the sampling values at the sampling effective points so that it is possible to easily detect whether there is a defect in the prepits or not. Accordingly, the defect in the prepits can be detected reliably and accurately.

As mentioned above, in accordance with the second embodiment of the present invention, in an optical or magnetooptic disk drive unit for performing focusing and tracking controls using a sample servo system at the recording and reproducing times of information, it is possible to easily and reliably detect a defect in a prepit portion as a sampling object. Further, it is possible to prevent in advance a tracking shift and incorrect control in operation of a PLL at the recording and reproducing times of information.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for detecting a defect in prepits as sampling objects formed on a recording face of an information recording medium in an optical or magnetooptic disk drive unit in which an optical or magnetooptic disk is used as the information recording medium and focusing and tracking controls are performed by using a sample servo system at recording and reproducing times of information, said method comprising the steps of:

checking a plurality of reproducing signals provided when a light spot moves onto said prepits in the detection of the defect therein and calculating an average value in voltage with respect to these reproducing signals;

setting said average value as a reference voltage level of said reproducing signals and setting a constant window width with respect to said average value;

producing sampling values from said reproducing signals corresponding to said prepits;

calculating the difference in voltage between said reference voltage level and each sampling value of each of the reproducing signals;

comparing said difference every sampling with said window width; and judging that said prepit is defective when said difference exceeds said window width.

2. A defect detecting method as claimed in claim 1, wherein said reference voltage level is set every information recording medium.

3. A method for detecting a defect in prepits as sampling objects formed on a recording face of an information recording medium in an optical or magnetooptic disk drive unit in which an optical or magnetooptic disk is used as the information recording medium and focusing and tracking controls are performed by using a sample servo system at recording and reproducing times of information, said method comprising the steps of:

obtaining a reproducing signal when a light spot moves onto said prepits;

extracting sampling points from said reproducing signal; and dividing said sampling points into sampling effective points and sampling ineffective points for detecting the defect; said sampling effective points for detecting the defect being sampling points corresponding to each of said prepits and sampling points which are intermediate points of said prepits, said sampling ineffective points for detecting the defect being sampling points located by one before and after the sampling point of each of said prepits, wherein said sampling effective points are utilized to determine whether there is a defect in said prepits.

4. A defect detecting method as claimed in claim 3, wherein a threshold value for a binary operation at the time of pattern matching is set by making signal ineffective at said sampling ineffective points.

5. A defect detecting method as claimed in claim 4, wherein the threshold value for a binary operation is compared with the sampling value at each of the sampling effective points.

* * * * *